United States Patent [19]

Schiel

[11] Patent Number: 5,081,759
[45] Date of Patent: Jan. 21, 1992

[54] VIBRATION DAMPING IN A ROLL

[75] Inventor: Christian Schiel, Heidenheim, Fed. Rep. of Germany

[73] Assignee: J.M. Voith GmbH, Fed. Rep. of Germany

[21] Appl. No.: 635,395

[22] PCT Filed: Oct. 7, 1987

[86] PCT No.: PCT/EP87/00578
§ 371 Date: Mar. 5, 1989
§ 102(e) Date: Mar. 5, 1989

[87] PCT Pub. No.: WO88/03610
PCT Pub. Date: May 19, 1988

Related U.S. Application Data

[63] Continuation of Ser. No. 563,934, Aug. 6, 1990, abandoned, which is a continuation of Ser. No. 350,551, Mar. 5, 1989, abandoned.

[30] Foreign Application Priority Data

Nov. 7, 1986 [DE] Fed. Rep. of Germany ....... 3638070

[51] Int. Cl.$^5$ .............................................. B21B 13/02
[52] U.S. Cl. .................... 29/116.1; 29/116.2; 29/113.1; 29/113.2; 100/162 B; 100/170
[58] Field of Search ................ 29/113.1, 113.2, 116.1, 29/116.2; 100/162 B, 170; 384/99, 100; 188/266, 290, 311, 314; 267/64.15

[56] References Cited

U.S. PATENT DOCUMENTS

| Re. 32,586 | 2/1988 | Schiel et al. | 100/162 B |
|---|---|---|---|
| 3,512,475 | 5/1970 | Justus | 100/170 |
| 4,091,517 | 5/1978 | Lehmann | 29/113.2 |
| 4,328,744 | 5/1982 | Pav et al. | 100/162 B |
| 4,514,887 | 5/1985 | Rauf et al. | 29/116.2 |
| 4,553,296 | 11/1985 | Eibe | 29/113.1 |
| 4,598,448 | 7/1986 | Schiel et al. | 29/116.2 |
| 4,726,691 | 2/1988 | Lehmann | 384/99 |

OTHER PUBLICATIONS

"Practical Results of Vibration Analysis", by J. B. Wheeldon and Dr. R. W. Hoyland, 11/12th Mar. 1981.

Primary Examiner—Joseph M. Gorski
Assistant Examiner—S. Thomas Hughes
Attorney, Agent, or Firm—Ostrolenk, Faber, Gerb & Soffen

[57] ABSTRACT

A cylinder has a roll shell that rotates around a fixed central axis. A first chamber arranged inside the cylinder is filled with liquid and transfers a supporting hydraulic force from the central axis to the shell. The first chamber is linked by a throttle to a second chamber located as well inside the cylinder, and in which is arranged for example a hermetically closed rubber hose filled with gas, so that the second chamber is at all times only partially filled with liquid. Thus, the volume of liquid contained in the second chamber can rapidly change when there is a change of pressure in the first chamber, so when the shell tends to vibrate, liquid flows back and forth through the throttle, converting wave energy into frictional heat by means of fluid friction, and thereby damping the vibration.

17 Claims, 3 Drawing Sheets

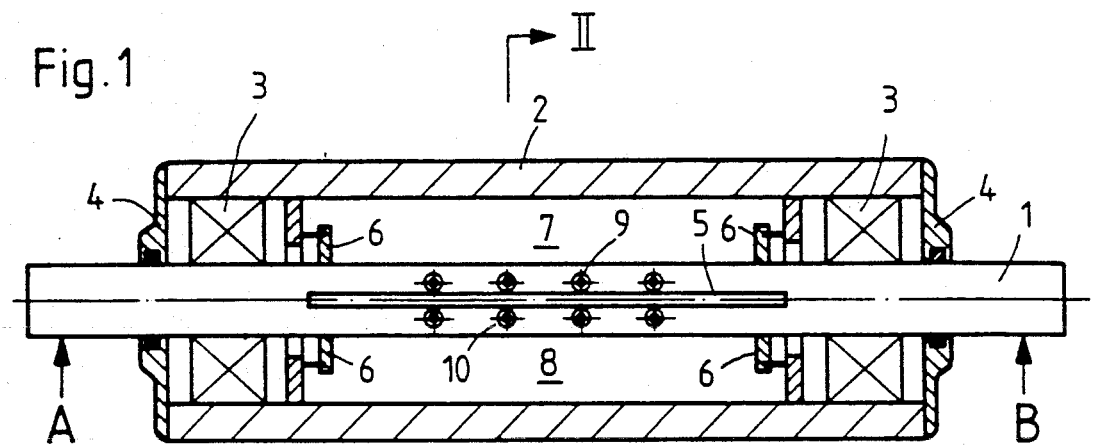
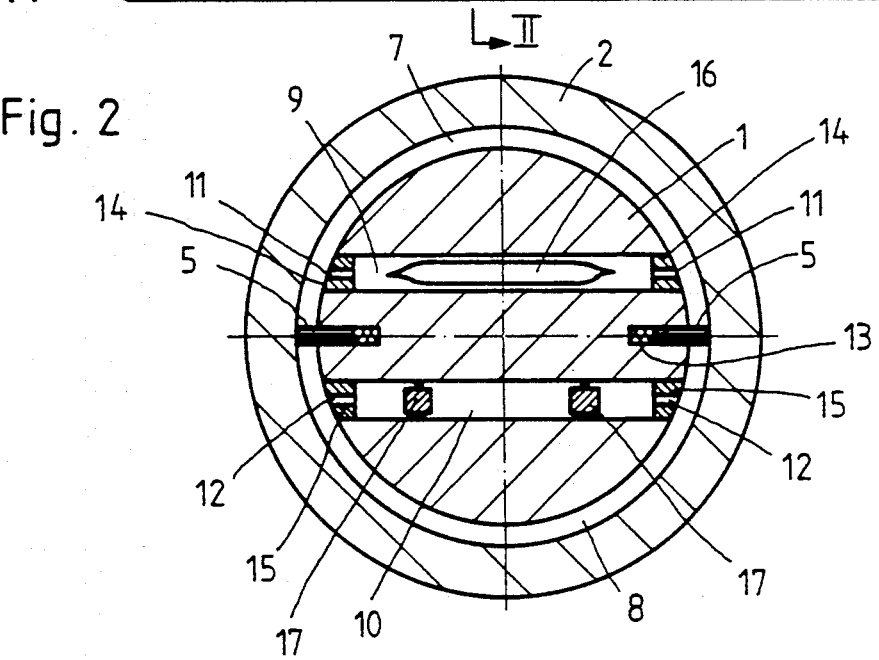
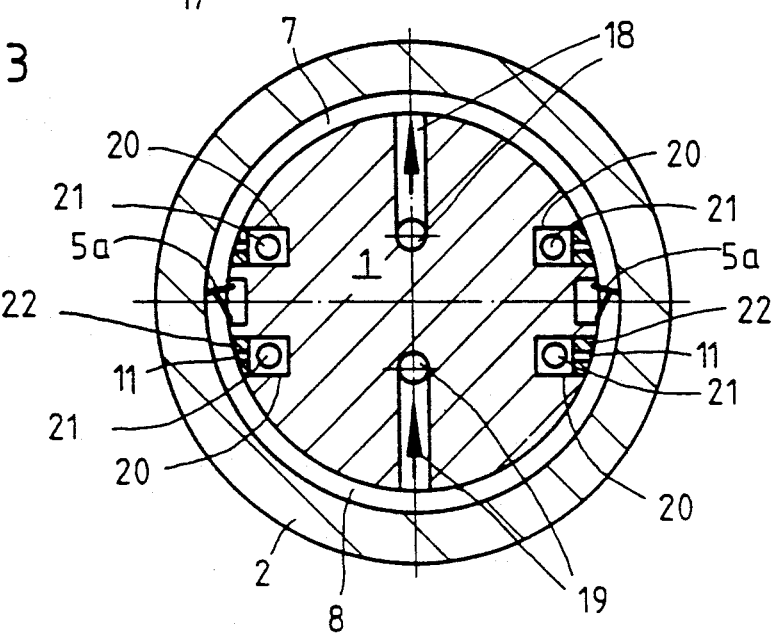

VIBRATION DAMPING IN A ROLL

This is a continuation of application Ser. No. 07/563,934 filed on Aug. 6, 1990, which is a continuation of application Ser. No. 07/350,551 filed on Mar. 5, 1989, now both abandoned.

BACKGROUND OF THE INVENTION

The invention relates to an improvement in a roll for machines used to produce or process paper-, cardboard-, textile-webs or the like, and particularly an improvement in certain prior art rolls discussed below. Rolls of this type, because of the specific use to which they are put, can be excited to unwanted vibrations. Vibration problems of this kind, arising in the press-sections and smoothing mechanisms of papermaking machines, have been described frequently in trade literature.

Examples:
1 DE-OS 33 06 838 (=U.S. Pat. No. 4,598,448)
2. US-PS 3 512 475
3. DE-OS 31 51 001 (=U.S. Pat. No. 4,514,887)
4. J. B. Wheeldon and Dr. R. W. Hoyland, The British Paper Board Industry Federation Spring Conference 11th to 12th of March 1981 "Practical Results of Vibration Analysis".

Claim 1 relates to an improvement of the roll known from Schiel et al. Claim 14 relates to an improvement of the roll of the roll known from Rauf et al. These unwanted vibrations are mainly contact-vibrations between two rolls. The roll according to the invention usually forms, with a counter-roll, a press-gap through which the web to be treated passes; it is preferably designed as a sag-compensating roll. However, the invention is also applicable to a single roll, e.g., a paper or felt guide-roll, which tends to vibrate in the range of its critical r.p.m.

Publication 1 describes a device for damping vibrations in a so-called floating roll. This is one of the many known designs of sag-adjusting rolls. The annular space between the stationary central axis and the rotating roll-shell is divided, by means of two longitudinal seals, into two semicircular chambers of approximately the same size, of the width of the machine, and filled with fluid. One of these chambers (that referred to in claim 1 as the "first chamber") is usually pressurized and serves to transfer a hydraulic supporting force from the central axis to the roll-shell. Fluid-cushions, isolated between the roll-shell and the central axis, are provided as the device for damping vibrations. Theoretical considerations indicate that the effect of this device is inadequate and it has not as yet had any practical application.

Another known sag-adjusting roll is described in publication 2 and also comprises a stationary central axis and a rotating roll-shell. In this case, two opposing sliding blocks are provided to transfer supporting forces from the central axis to the inner surface of the roll-shell, each of the said blocks being supported by a radially displaceable piston. Each of the pistons is guided in a recess 27 in the central axis. Both recesses may be acted upon from the outside by pressurized fluid; they may also be connected together by a certain number of choke-passages. One of these recesses therefore corresponds to the "first chamber" mentioned in claim 1, while the other corresponds to the "second chamber". This known arrangement is also intended to damp vibration of the roll-shell, but its effectiveness appears to be doubtful. In any case, the high cost of the two opposing shoes is unsatisfactory. This cost would be justified only if the roll, as provided for in Justus et al. were arranged between two counter-rolls and formed a press-gap with each of them. As a sag-adjusting roll for arrangements comprising a single press-gap, this known roll would not be suitable because substantially the same pressure would obtain in both "chambers" 27.

Publication 3 describes a sag-adjusting roll in which the transfer of supporting forces from the central axis to the roll-shell is effected with the aid of sliding blocks 8 which are radially mobile in relation to the central axis and comprise hydrostatic bearing pockets 18, 25. Located between sliding blocks 8 and the central axis are cylinder-spaces 14, 21 corresponding to the "first chamber" mentioned in claim 14. The cylinder spaces can be acted upon from the outside and are in communication, through so-called outlet-ducts 17, 24, with hydrostatic bearing pockets 18, 25. Here again, the purpose is to damp vibrations of the roll-shell. To this end, a resiliently acting and externally arranged pressure-accumulator 35 is connected to the pressure-medium line running to the pressure-areas, the said pressure-accumulator corresponding to the "second chamber" mentioned in claim 14. One disadvantage of this known device is that a relatively large volume of pressurized fluid must overflow continuously between the inner surface of the roll-shell and the edges of the bearing pockets. This fluid would leak out of the roll and would have to be replaced.

SUMMARY OF THE INVENTION

It is the purpose of the present invention to improve the known rolls in such a manner that the most effective possible damping of vibrations in the roll-shell can be achieved at the lowest possible cost.

This purpose is accomplished by means of the characteristics set forth in claims 1 or 14. In claim 1, it is assumed (as already indicated) that the "first chamber" is in the form of a semi-circular area located between the stationary central axis and the rotating roll-shell. According to Schiel et al. in the case of a known roll of this design, the first chamber is connected, through a constricted line, with a second chamber also located in the interior of the roll. This second chamber is defined, within the first chamber, by an annular piston, one end-face of which bears against the inner surface of the roll-shell, the gap located between the roll-shell and the end-face forming the constricted line between the first chamber and the second chamber. In contrast to this prior art, provision is made, according to the invention, for the fluid in the second chamber to fill the said second chamber only partly, so that the volume of fluid in the second chamber varies, more particularly it can vary very rapidly. Actually the invention is based upon, among other things, the knowledge that the vibrations to be damped are usually very small in amplitude, usually definitely less than 0.1 mm, and it is precisely such vibrations that can be damped particularly effectively by the characteristics of the invention. The amplitude of the vibrations is particularly small when they begin. In the past, not enough attention has been paid to this and conventional vibration-dampers develop their full effect only at the larger amplitudes. The frequency of the vibrations which can be damped by the invention is approximately between 50 and 400 Hz.

Claim 14 assumes that there is at least one fluid-filled "first chamber" in the form of a cylinder-space and located between the central axis and a sliding block bearing against the roll-shell and being displaceable, in the radial direction, in relation to the central axis. In the case of a known roll of this design (Rauf et al)—and as already indicated—a second chamber in the form of a resiliently acting (and therefore only partly filled with fluid) pressure-accumulator is provided for damping the vibrations of the roll-shell. This arrangement requires very long connecting lines between the first chamber and second chamber, passing through the central axis to the outside. The fluid-mass in this long line produces a largely rigid hydraulic coupling between the central axis and the roll-shell. This almost entirely eliminates the desired damping effect. In contrast to this prior art, provision is made, according to the invention, for the second chamber, used to compensate for the volume, to be arranged just like the first chamber, in the interior of the roll. It is thus fitted directly in or at the central axis and it is connected, through a short constricted line, e.g. a choke-passage, to the first chamber. This makes possible effective damping of very small amplitude vibrations of the roll-shell.

In the simplest case, i.e. with atmospheric pressure in the chambers, the second chamber, which is always arranged directly in or at the central axis, is in the form of a volume-compensating vessel, the upper part of which and is filled with air, is connected to the free environment through an aerating and venting line. As a rule, however, an overpressure is adjusted in the first chamber. In this case, the second chamber which, as known from Rauf et al, is again arranged directly in or at the central axis, is in the form of a resiliently flexible pressure-accumulator. In this case, the pressure of a gas-cushion, or the force of a spring or the like, counteracts the fluid-pressure in the second chamber. The gas-pressure and the spring-force are preferably variable for the purpose of optimizing the vibration damping. To this end it is also possible to vary the number and/or dimensions of the constricted lines connecting the two chambers. It is to be understood that, instead of only a single second chamber, it is also possible to use several such chambers to optimize the damping effect.

The drive for the flow of fluid through the constrictions is based upon the heavy mass of the central axis, the inherent frequency of the bending vibrations thereof being lower by a multiple than the frequency of the vibrations of the roll-shell which are to be damped.

Without a substantial unimpeded exchange of fluid between the first chamber and the (at-least-one) second chamber, the incompressible fluid in the first chamber would merely cause the central axis to move in time with the vibrational frequency of the shell and there would be a rigid coupling between the said shell and the central axis. On the other hand, if the first chamber, located between the central axis and the roll-shell, were to be filled with a compressible gas, the said roll-shell would be able to vibrate practically unaffected by the central axis. Even if the first chamber were to be filled only partly with a compressible gas, i.e. if it were not completely filled with fluid, or if there were no constrictions between the first and second chambers and there were no fluid-friction in the constrictions, the damping of the vibrations would not be possible.

If a gas-cushion is provided, the damping action is improved if a flexible partition is provided in the second chamber. This separates the gas-cushion from the fluid and prevents bubbles of gas from reaching the first fluid-chamber.

In both of the above variants the volume of gas can be closed off hermetically from the outside, i.e. no gas must be added while the roll is in operation.

According to another concept of the invention, if the pressure in the first fluid-chamber changes, the gas-mass in the second chamber is adapted in such a manner that the volume of gas therein remains approximately constant. The advantage of this is that, as the fluid-pressure increases, there is no reduction in gas-volume and therefore no decrease in the volume-compensating ability of the second chamber. To this end, the gas-space in the second chamber may communicate, through a connecting line through the central axis, with an external gas-accumulator which is controlled, as a function of pressure, in such a manner that, if the pressure in the first fluid-chamber rises, a corresponding gas-mass is added through the connecting line while, if the pressure in the first fluid-chamber falls, a corresponding gas-mass is removed.

According to another aspect of the invention, the constricted cross-section is to be designed, not as a choke-orifice, but as a choke-gap or choke-passage since, in the case of a choke-orifice, the differential pressure responsible for converting kinetic energy into frictional heat increases with the square of the flow velocity, whereas in the case of a choke-gap or choke-passage the increase is linear. This means that the energy conversion, in the case of the choke-orifice, is meaningless at small amplitudes if the optimal energy-conversion is designed for larger amplitudes. Conversely, energy-adsorption at large amplitudes is extremely small if the choke-orifice is designed for small amplitudes. In the latter case there is almost rigid coupling between the roll-shell and the central axis.

This unsatisfactory behavior of the choke-orifice may be overcome if, with the aid of a choke-gap or choke-passage, most of the energy-conversion is effected by wall-friction at a low flow-velocity.

According to one very simple, preferred configuration of the invention, the volume of gas in the second chamber is held ready in a gas-filled flexible tube closed off at both ends.

According to an equally simple alternative, the necessary gas-volume is accommodated, in the form of small bubbles, in a foamed elastomeric element.

The flow-resistance in the constricted connecting lines causes the central axis to move also when the roll-shell vibrates. If (because of an excessive flow-cross-section in the connecting lines) the central axis moves too little, e.g. less than 10% of the shell-amplitude, then the conversion of vibrational energy into frictional heat decreases so sharply that, under certain circumstances, the damping effect is no longer sufficient. The same applies if the vibration-amplitude of the central axis, because of an inadequate flow-cross-section in the connecting lines, is more than about 90% of the shell-amplitude. Here again, the damping would no longer be sufficient. In order to prevent this, provision is made, depending upon the main vibration frequency to be damped, for the cross-section of the constricted connecting line, between the first chamber and the second chamber (or the sum of all cross-sections in these connecting lines), to be established at a value of between 0.0005- and 0.05- times the periphery of the first chamber which produces the supporting force acting upon the roll-shell. In the case of a floating roll, the said periphery of the first chamber is formed by the internal surface of the roll-shell itself. In the case of roll of which the shell is supported by a sliding block, the said periphery of the first chamber is formed by the end-surfaces of the sliding-block piston.

In other words: the hydraulic conversion of the very small amplitude of the roll-shell vibration into the relatively large flow-path of the fluid in the constriction should be between 1 : 2000 and 1 : 20.

According to another preferred configuration of the invention, the space between the central axis and the rotating roll-shell is divided, by longitudinal sealing strips and end-seals, into two semicircular chambers which are approximately of the same size and are filled with fluid; i.e. there are two "first chambers". Now it is essential for at least one second chamber in the form of a pressure-accumulator to be associated with each first chamber, and for at least one of the connecting lines (between a first and a second chamber) to be in the form of a constricted line. The connecting lines to the associated second chamber (or to the associated second chambers), connected to the other (semicircular) chambers, may or may not contain constrictions. If it is to be expected that one of the two first chambers will not always be filled with fluid, then the constrictions may be omitted at that first chamber in which the lower pressure obtains and in which some gas will be expected occasionally.

According to a further configuration of the invention, the rotating roll-shell will be supported, corresponding to EP-PS 0 043 119, upon bearings at the same distance apart as the central axis. This design eliminates resonance between the inherent vibration of the central axis and the contact-vibration of the roll-shell in relation to the counter-roll. Furthermore, it will extend relative mobility between the roll-shell and the central axis, leading to improved elimination of vibration-energy.

BRIEF DESCRIPTION OF THE DRAWINGS

The invention is explained hereinafter in greater detail in conjunction with FIGS. 1 to 9, showing preferred embodiments thereof, wherein:

FIG. 1 is a diagrammatical longitudinal section through a roll with vibration damping:

FIG. 2 is a cross-section through a roll similar to that shown in FIG. 1, along the sectional line II—II;

FIG. 3 is a cross-section through a roll having another arrangement of damping elements;

DETAILED DESCRIPTION

Figure 4:
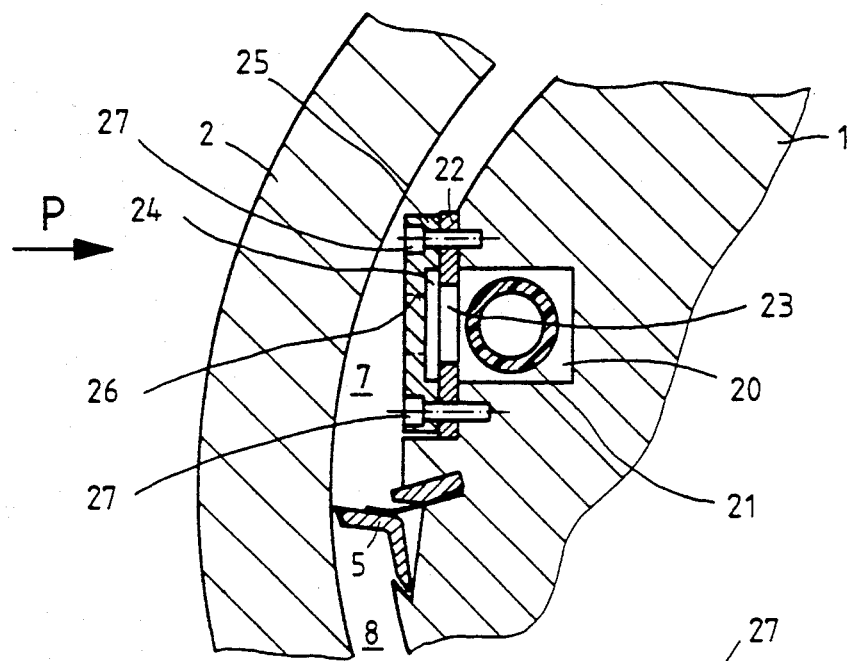
FIG. 4 is an enlarged cross-section through the damping element according to FIG. 3.

In FIG. 1, 1 is the stationary central axis which is supported at A and B upon the frame of the machine, not shown, or upon mobile levers. A roll-shell 2 rotates about central axis 1 in self-aligning bearings 3. Rotating shell 2 is closed off laterally by means of covers 4. By means of two longitudinal seals 5 and end-sealing arrangements 6, the interior of roll-shell 2 is divided into two semi-circular chambers 7 and 8, at least one of which is completely filled with fluid when the roll is in the operative condition, and is thus designed as a "first chamber" within the meaning of claim 1. It is assumed in FIGS. 1 to 3 that both semicircular chambers 7 and 8 are permanently completely filled with fluid and that both thus form a "first chamber" within the meaning of claim 1. Fluid feed- and return-lines from the outside to chambers 7 and 8 are not shown, but will usually be present.

Provided in central axis 1 are "second chambers" in the form of transverse passages 9, 10. The "second chambers" are connected, through constricted openings 11/12 with fluid-filled "first chambers" 7/8. It is assumed in FIG. 1 that the diameter of central axis 1 remains constant throughout its length. As a rule, however, the diameter of central axis 1, in the area between the two bearings 3, is only slightly smaller than the inside diameter of the roll-shell, as shown in the other figures.

FIG. 2 again shows central axis 1, surrounded by roll-shell 2, and with longitudinal seals 5 which are pressed against the said roll-shell by means of springs 13. Upper semicircular "first chamber" 7 is connected, through constrictions 11 (choke-passages incorporated into plugs 14), to the "second chamber" which is in the form of a transverse passage 9. Located in the interior of transverse passage 9 is a gas-filled, hermetically sealed, flexible-tube section 16, made of a flexible, rubber-like material.

The lower "second chamber", also in the form of a transverse passage 10, is connected, through constrictions 12 in plugs 15, to lower first fluid-chamber 8. Located in transverse passage 10 are floating pistons 17 adapted to move freely in the horizontal direction and constituting seals in the wall of transverse passage 10. The section of transverse passage 10 between floating pistons 17 is filled with gas.

In FIG. 3, which also represents a cross-section through a roll according to the invention, 1 is the central axis, 2 is the roll-shell, 5a is the longitudinal seals, 7 and 8 are the fluid-filled first chambers, 18 is a fluid feed-line coming from the outside, and 19 is a discharge-line leading to the outside. Milled into central axis 1, above and below each longitudinal seal 5a are "second chambers" in the form of a longitudinal groove 20. Lying in each of these longitudinal grooves 20 is a hermetically sealed rubber tube 21 containing a gas. The cavity formed by longitudinal grooves 20 is closed off by a cover 22 into which constrictions 11 (e.g. choke-passages) are machined.

FIG. 4 shows one of these "second chambers", in the form of longitudinal grooves 20, to an enlarged scale, with constrictions of a design differing from that in FIG. 3. Cover 22 comprises openings 23 distributed over the width thereof and opening into a flat duct 24 machined into another cover 25. The latter has openings 26 which are offset axially in relation to openings 23 and which connect duct 24 to first fluid-chamber 7. Duct 24 thus forms a choke-gap connecting first chamber 7 to second chamber 20.

Both covers 22 and 25 are secured by screws 27 to central axis 1.

Figure 5:
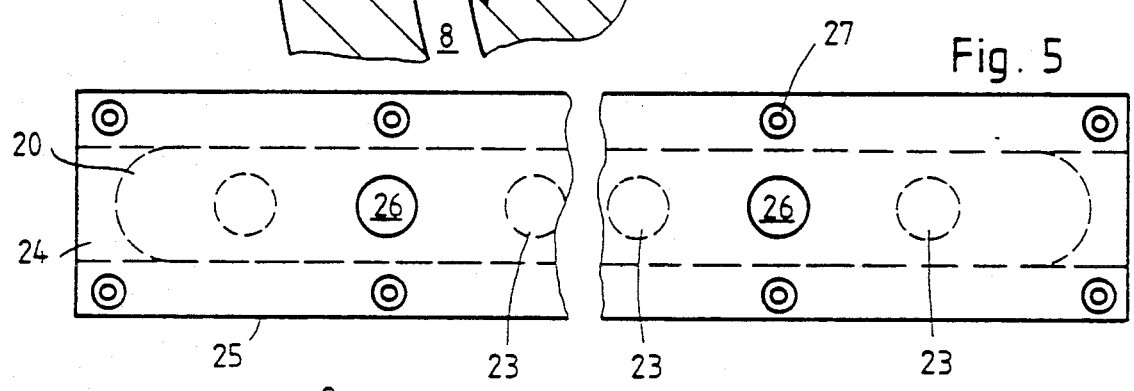
FIG. 5 is a plan view of the damping element in the direction of arrow P in FIG. 4.

FIG. 5 shows the second chamber of FIG. 4 which is in the form of a longitudinal groove 20, openings 23, cover 25, openings 26 and screws 27. Gas-filled flexible tube 21, extending over the length of longitudinal groove 20, is not shown.

Figure 6:
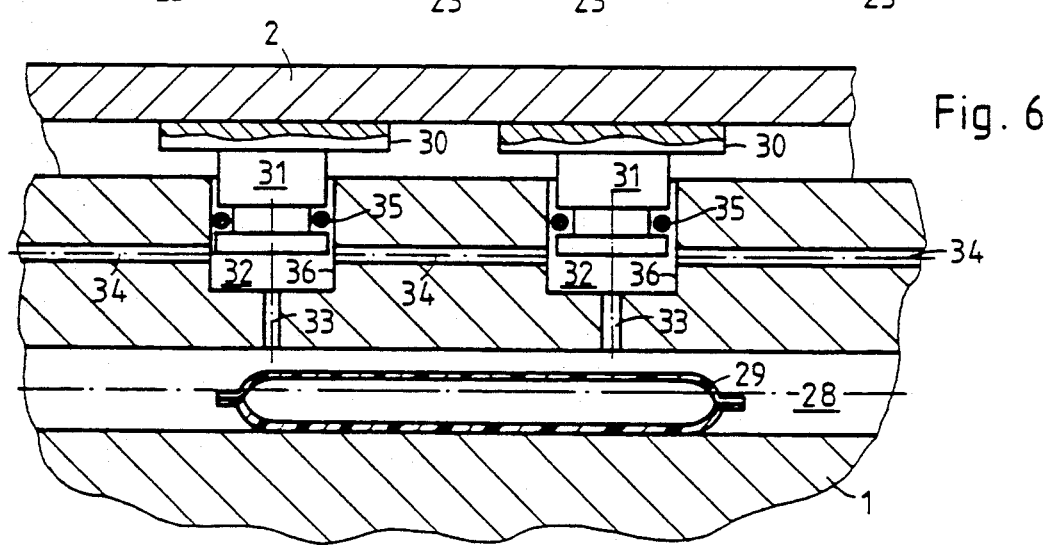
FIG. 6 is a partial longitudinal section through another design-variant of the roll.

In FIG. 6, 1 is again the central axis and 2 the rotating roll-shell. Located in central axis 1 is a passage 28 in which gas-containing tube-sections 29 are arranged.

Passage 28 forms a second chamber and is supplied with pressurized fluid through the trunnions of central axis 1 (not shown). Sliding blocks 30 are pressed, by pistons 31, against roll-shell 2 as a result of excess pressure in "first chambers" 32 in the form of cylinder-spaces which communicate, through constrictions 33, with second chamber 28. A preferably one-time or periodic removal of gas from cylinder-spaces 32 is made possible through a vent-line 34 which connects the said cylinder-spaces, and which finally leads to the outside through the trunnions of central axis 1. Each piston 31 is sealed in relation to passage-surface 36 by means of a sealing ring 35.

Lubrication of the surfaces of sliding blocks 30 supporting roll-shell 2 is effected hydrodynamically in known fashion. In this example of an embodiment of the invention, each cylinder-space 32 forms a "first chamber" (within the meaning of claim 1), while passage 28 forms the "second chamber".

Figure 7:
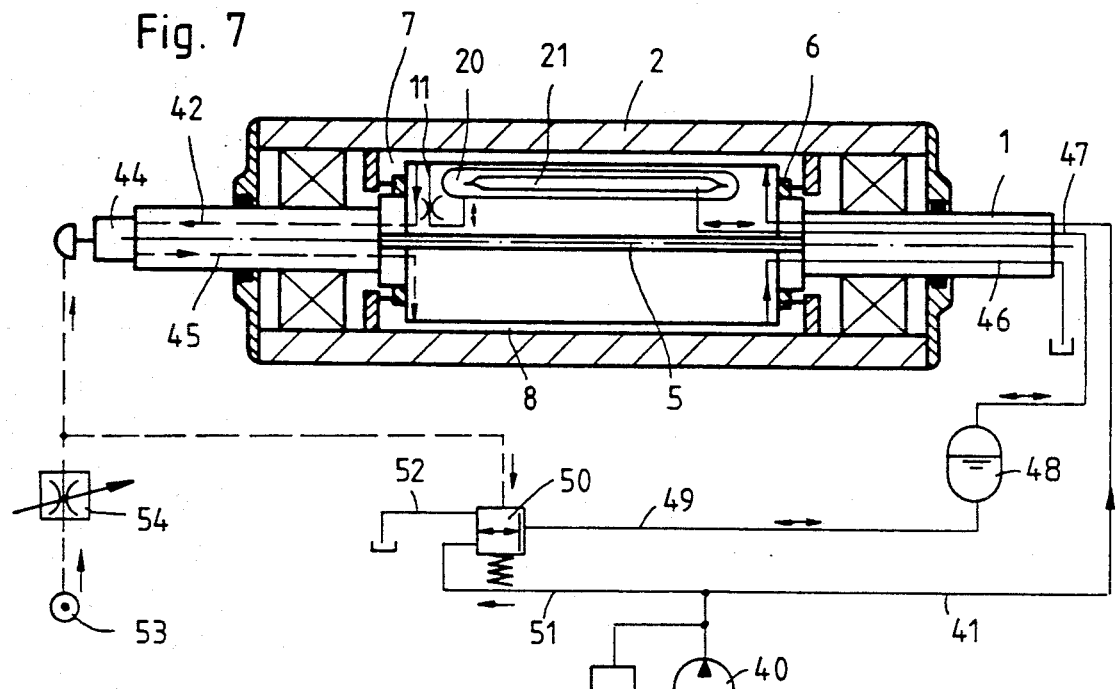
FIG. 7 is a diagrammatical representation of a control-element for a vibration-damped roll.

In FIG. 7, the essential parts of the roll bear the same reference numerals as in FIG. 1.

As a "second chamber" a groove 20 with a gas-filled flexible tube 21 is provided in central axis 1 (as in FIG. 4). The cover closing off groove 20 is omitted. A pressurized-fluid pump 40 delivers fluid, through a feed-line 41, into the upper "first-chamber" 7 in the form of a semicircular fluid-chamber. For the purpose of controlling fluid-pressure, this is connected, through line 42, to an overflow valve 44. A line 45 runs from this into lower semicircular chamber 8 in which normally little or no overpressure exists. A discharge line 46 runs hence to the outside. The constricted connecting line running from upper semicircular chamber 7 to groove 20 is indicated diagrammatically at 11. The interior of flexible tube 21 is connected, through a line 47, to the upper part of a hydraulic accumulator 48. The lower part thereof is adapted to be connected, through a line 49 and a pressure-regulating valve 50, either to a branch 51 of the pressure-line from pump 40, or to a relief-line 52. Compressed air at a variable pressure may be fed from a compressed-air source 53, and through a pressure-control valve 54, both to overflow valve 44 and to pressure-regulating valve 50. An increase in air-pressure brings about, on the one hand, an increase in pressure in fluid-chamber 7 ("first chamber"), and thus a simultaneous increase in the fluid-pressure in groove 20 ("second chamber") and, on the other hand, it brings about a rise in the level of fluid in hydraulic accumulator 48. In spite of the increase in fluid-pressure in groove 20, therefore, the volume of the gas-cushion in flexible tube 21 is kept substantially constant.

Figure 8:
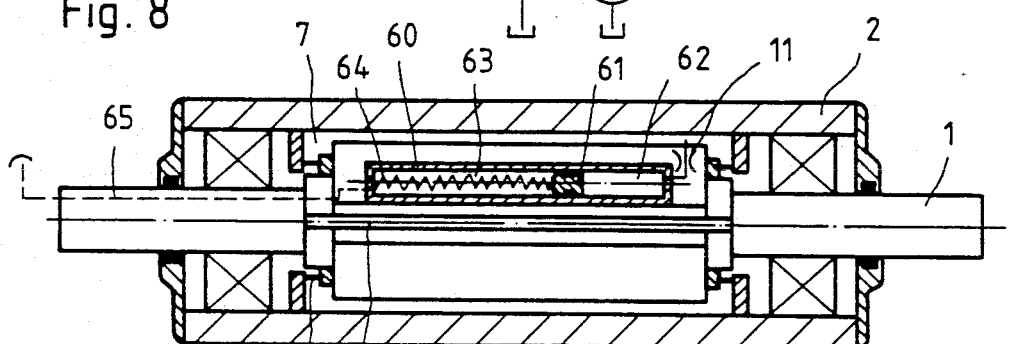
FIGS. 8 and 9 show two further examples of damping elements.

FIG. 8 illustrates diagrammatically how a "second chamber" may be designed as a spring-loaded and thus resiliently flexible pressure-accumulator. Located in an elongated cylinder 60 is a piston 61 which is displaceable therein and which divides the interior of the cylinder into a fluid-chamber 62 and an atmospheric chamber 63. The said fluid-chamber is connected, through a constricted line 11, to the "first chamber", namely to upper semicircular chamber 7. Atmospheric chamber 63, in which a compression-spring 64 is arranged, is connected, through an aerating and venting line 65, to the external environment of the roll.

Figure 9:
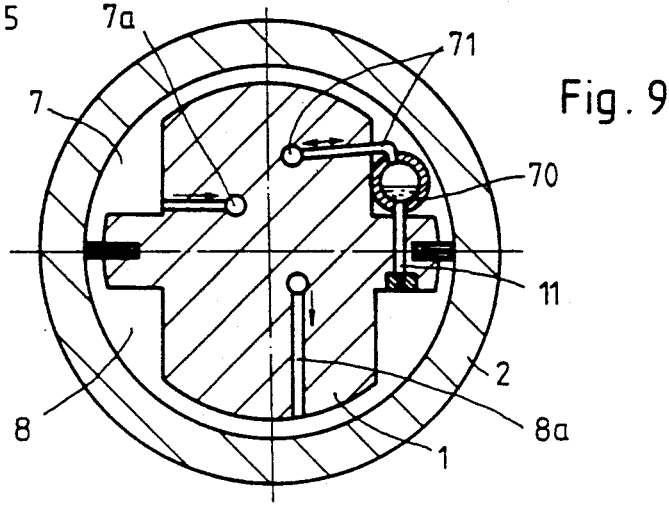

In FIG. 9 it is assumed that lower semicircular fluid-chamber 8 is the "first chamber" and is thus at all times completely filled with fluid, but that the fluid-pressure is only slightly higher than atmospheric pressure. Fluid leaking from upper semicircular discharge-line 7a.

Lower fluid-chamber 8 is kept full at all times through a feed-line 8a. Arranged in upper chamber 7 is a "second chamber", namely a tubular compensating tank 70, the lower part of which is connected, through a constricted line 11, to lower semicircular fluid-chamber 8 (=second chamber). Its upper part is connected, through an aerating and venting line 71 to the atmosphere.

What is claimed is:

1. A vibration-damped roll for machines used to produce or process paper-, cardboard-, or textile-webs comprising:
   a stationary central axis;
   a roll-shell rotating about the center axis;
   a first chamber, located within the roll shell, the first chamber being defined at least in part by a semiconductor space substantially surrounding the central axis and being filled with a fluid adapted to transfer a a hydraulic supporting force from the central axis to the roll-shell; the first chamber being connected, through at least one constricted line, to a second chamber also located within the roll shell; and
   gas-containing resilient means preventing the second chamber from being completely filled with fluid so that, in the event of changes in pressure in the first chamber, the amount of fluid in the second chamber varies in response to such pressure changes in the first chamber, whereby the constricted line, the gas-containing resilient means, and the second chamber are means for counteracting any vibration of the roll-shell.

2. A roll according to claim 1, wherein when the roll is in the stationary condition, the pressure obtained both in the first chamber and in the second chamber is approximately atmospheric; and wherein the second chamber is connected to the atmosphere by means of an aerating and venting line running through the central axis.

3. A roll according to claim 1, wherein said pressure-counteracting means comprises a gas-cushion in the second chamber, which comprises a flexible partition which separates the gas-cushion from the fluid.

4. A roll according to claim 1, wherein the vibration counteracting means comprises a gas-cushion, located in the second chamber, which is closed off hermetically.

5. A roll according to claim 1, wherein the vibration-countering means comprises a gas-cushion, located in the second chamber, connected to pressurizing means which controllably changes the pressure of the gas-cushion located in the second chamber, in response to a change in the average fluid-pressure existing in the first chamber, in such a manner that the volume of the gas-cushion remains at least approximately constant.

6. A roll according to claim 1, wherein the constricted line has a predetermined length and inside diameter and includes a portion having an inside width which is approximately constant, while the length thereof is a multiple of the said inside diameter.

7. A roll according to claim 1, the vibration counteracting means comprises a gas-cushion contained in a flexible tube which is closed off at both ends.

8. A roll according to claim 1, the vibration counteracting means comprises a gas-cushion formed by cavities in a foamed elastomeric element.

9. A roll according to claim 6, wherein said portion is a choke-passage.

10. A roll according to claim 6, wherein said portion is a choke-gap.

11. A roll according to claim 1, having two first chamber which are defined in an annular space located between the stationary central axis and the rotating roll-shell, which is divided, by means of two longitudinal seals, into two semi-circular chambers of approximately the same size and filled with fluid having a length thereof being substantially equal to the width of the web, and each of the two first chambers being connected by connecting lines to a second chamber which includes a pressure-accumulator, at least one of the connecting lines including a constricted line.

12. A roll according to claim 1, wherein at each end of the roll, a support for the stationary central axis, and a bearing for the roll-shell, are arranged approximately centrally of each other.

13. A roll according to claim 1, wherein said first chamber has a predetermined inner peripheral surface area and said at least one constricted line has an inner peripheral surface area of between 0.0005 and 0.05 times the inner peripheral surface area of the first chamber.

14. A vibration-damped roll comprising:
 a stationary central axis;
 a roll-shell rotating about this center axis;
 at least one first chamber arranged within the roll shell, between the central stationary axis and the rotating roll-shell, the at least one first chamber being defined at least in part by a cylindrical space which is filled with a fluid;
 means including a sliding block for transferring a hydraulic supporting force from the central axis, via the fluid in the cylindrical space, and via the sliding block to the roll-shell;
 a second chamber also arranged within the roll shell; the first chamber being connected through a constricted line to the second chamber;
 gas-containing resilient means preventing the second chamber from being completely filled with fluid, so that, in the event of changes in pressure in the first chamber, the extent to which the second chamber is filled with fluid varies in response to such changes, whereby the constricted line, the gas-containing resilient means, and the second chamber are means for counteracting any vibration of the roll-shell.

15. A roll according to claim 14, wherein the first chamber is connected to the atmosphere through a venting line.

16. A vibration-damped roll for machines used to produce or process paper-, cardboard-, or textile-webs comprising:
 a stationary central axis;
 a roll-shell rotating about the central axis;
 a first chamber, located within the roll shell, the first chamber being defined at least in part by a semiconductor space substantially surrounding the central axis and being filled with a fluid adapted to transfer a hydraulic supporting force from the central axis to the roll-shell; the first chamber being connected, through at least one constricted line, to a second chamber also located within the roll shell; and
 the second chamber being partially filled with a gas, thereby preventing the second chamber from being completely filled with fluid so that, in the event of changes in pressure in the first chamber, the amount of fluid in the second chamber varies in response to such pressure changes in the first chamber, whereby the constricted line and the second chamber are means for counteracting any vibration of the roll-shell.

17. A vibration-damped roll comprising:
 a stationary central axis;
 a roll-shell rotating about this center axis;
 at least one first chamber arranged within the roll, between the central stationary axis and the rotating roll-shell, the at least one first chamber being defined at least in part by a cylindrical space which is filled with a fluid;
 means including a sliding block for transferring a hydraulic supporting force from the central axis via the fluid in the cylindrical space, and via the sliding block, to the roll-shell;
 a second chamber also arranged within the roll-shell; the first chamber being connected through a constricted line to the second chamber;
 the second chamber being partially filled with a gas, thereby preventing the second chamber from being completely filled with fluid so that, in the event of changes in pressure in the first chamber, the extent to which the second chamber is filled with fluid varies in response to such changes, whereby the constricted line and the second chamber are means for counteracting any vibration of the roll-shell.

* * * * *